Nov. 4, 1924.
A. RIEHLE
1,514,304
ATTACHMENT FOR CORN BINDERS
Filed March 19, 1923
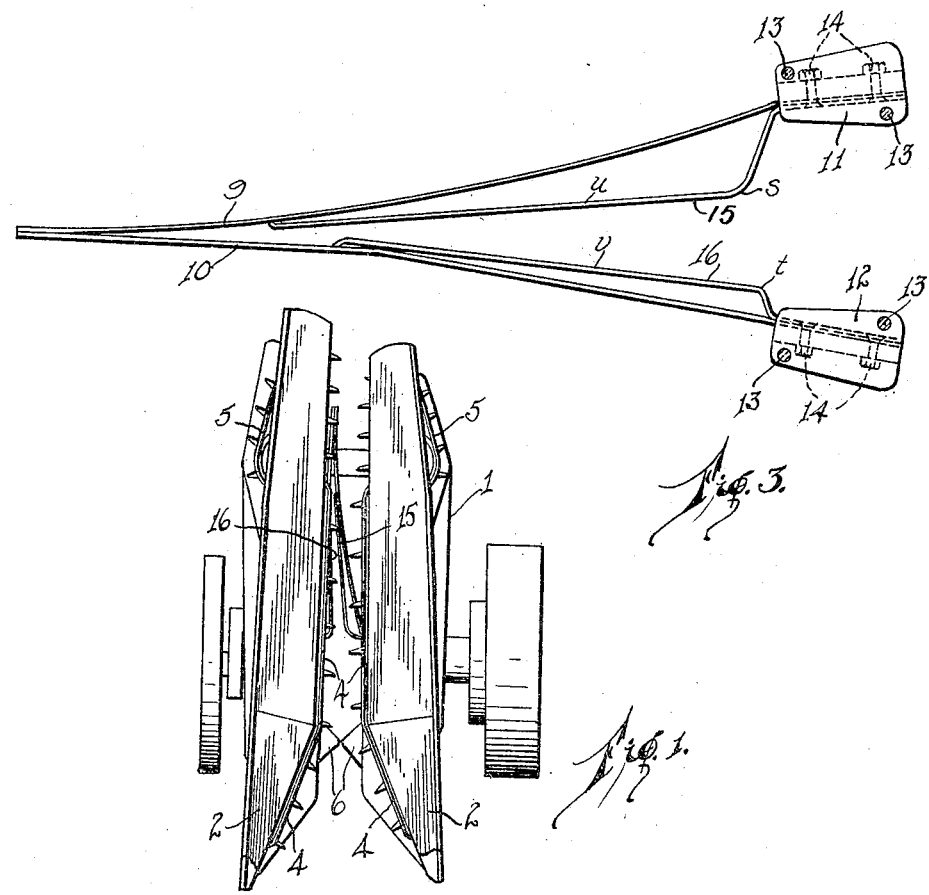
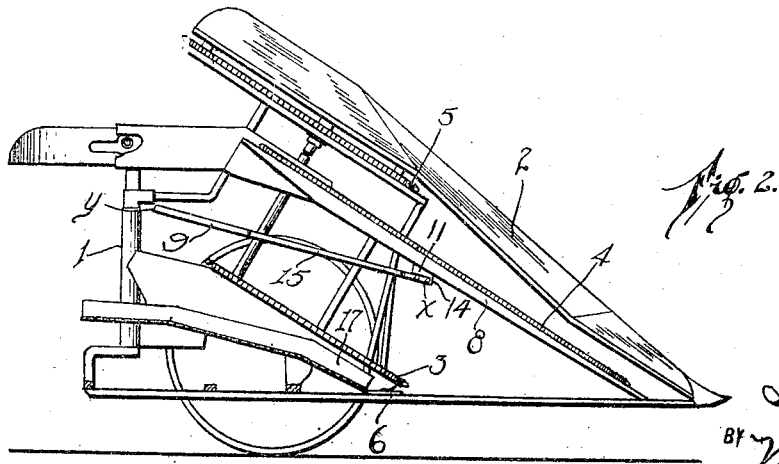
INVENTOR
A. Riehle
BY Munn &Co.
ATTORNEYS Patented Nov. 4, 1924.

1,514,304

UNITED STATES PATENT OFFICE.

ANTON RIEHLE, OF FORT ATKINSON, IOWA.

ATTACHMENT FOR CORN BINDERS.

Application filed March 19, 1923. Serial No. 626,136.

*To all whom it may concern:*

Be it known that I, ANTON RIEHLE, a citizen of the United States, and a resident of Fort Atkinson, in the county of Winneshiek and State of Iowa, have invented a new and useful Improvement in Attachments for Corn Binders, of which the following is a full, clear, and exact description.

My invention relates to improvements in attachments for corn binders, and it consists in the combinations, constructions, and arrangements herein described and claimed.

An object of my invention is to provide an attachment for corn binders which is adapted to keep the corn, whether it be tall or short, in a vertical position during the time it is passing from the place where it is cut to the place where it is tied in bundles.

A further object of my invention is to provide a device of the type described which prevents the corn from falling out of a vertical position, whereby the machine will not be choked by the corn as the corn is being fed therethrough.

A futher object of my invention is to provide a device of the type described which is adapted to support the short corn so that the latter will not be tied so near the top of the bundle as is the case when the device is not attached to the corn binder, thereby obviating the disadvantage of having the bundle become untied after it is released from the binder.

A further object of my invention is to provide a device of the type described which is extremely simple in construction and which may be attached to an ordinary corn binder without any alterations being necessary in the latter.

Other objects and advantages will appear in the following specification, and the novel features of the invention will be particularly pointed out in the appended claim.

My invention is illustrated in the accompanying drawings forming part of this application, in which—

Figure 1 is a front elevation of a corn binder showing the device operatively applied thereto, Figure 2 is a vertical section through the corn binder, showing the device in place, and Figure 3 is a plan view of the device.

In carrying out my invention, I make use of an ordinary corn binder 1 which has corn guiding members 2, these members extending at an angle with respect to the ground, as is clearly shown in Figure 2. The corn is received between the members 2 and is guided into the machine by the members and by chains 3, 4, and 5. As the machine is moved along the row of corn, the corn will be received between the members 2 and will be conveyed to the cutting knives 6 by means of the chain 4. The chains 3 to 5 inclusive are actuated as the machine is moved along the ground. Just before the corn is engaged by the knives 6 the corn will be received by the chains 3 and 5. As clearly shown in Figure 1, there are two sets of chains 3 to 5 inclusive, the chains of each set being positioned beneath the members 2. The chains are inclined at substantially the same angle as the angle of the members 2. As soon as the corn is cut it is conveyed upwardly by all of the chains. The parts thus far described are ordinary in construction, and form no part of my invention except in so far as they co-operate with the parts about to be described.

I have found that in many instances, the corn will not be held in a vertical position during the time it is being conveyed from the knives. If the corn is not held in a vertical position it will choke the machine, thus compelling the operator to stop the machine and clear the corn from the chains before the device can again be operated. I provide an attachment which is adapted to hold the corn in a vertical position from the time it is cut to the time it is bound in bundles, this device being adapted to hold the corn whether the corn is tall or short. The device is adapted to be secured to the frame 8 which carries the chains 4. The attachment comprises two relatively long leaf springs 9 and 10, (see Figure 3), these springs being secured to brackets 11 and 12 respectively, the brackets in turn being fastened to the frames 8 by means of bolts 13. The springs 9 and 10 are secured to the brackets 11 and 12 by means of bolts 14. The springs extend rearwardly from a point $x$, (see Figure 2) to a point $y$. The springs extend slightly upwardly from a horizontal plane, but do not extend at the same angle as do the chains 3 to 5 inclusive.

In addition to the springs 9 and 10 I provide small springs 15 and 16, these springs also being secured to the brackets 11 and 12 by means of the bolts 14. The spring 15 is slightly longer than the spring 16. It will be noted from Figure 3 that the springs 15 and 16 are bent inwardly at points $s$ and $t$, whereby the portions $u$ and $v$ of the springs are disposed substantially parallel with respect to each other. The portions $u$ and $v$ of the springs 15 and 16 and the end portions of the springs 9 and 10 provide a relatively long clamping means for holding the corn in vertical position from the time it is cut by the knives to the time it is bound in bundles. The springs 9 and 10 and 15 and 16 are disposed between the frames 8 which carry the chains 4, and the frames 17 which carry the chains 3, whereby the springs will engage with all of the corn that is being fed to the machine, whether the corn be tall or short.

From the foregoing description of the various parts of the device, the operation thereof may be readily understood. As heretofore stated, the device is readily attached to an ordinary corn binder by means of bolts 13. The device engages with the corn that is cut and prevents the corn from falling out of a vertical position. It is obvious that if the short corn is fed to the packers in a vertical position, the corn will be tied at a lower point in the bundle than if the corn were slanted from a vertical position. In this way, the attachment provides an efficient means for holding the corn in such a position that it will be tied at a point nearer the center of the bundle than it would if the attachment were not used. The attachment is very simple in construction, and is not likely to get out of order easily. It will be noted that the spring 16 is shorter than the spring 15, thus providing an attachment in which the space between the springs is substantially of the same width, the entire length of the portions $u$ and $v$. The springs 9 and 10 converge toward each other so that the ends of the springs abut one another. The spring 15 extends beyond the end of the spring 16 so as to make the space between the spring 15 and the portion of the spring 10 that extends between the end of the spring 16 and the end of the spring 15, of substantially the same width as the space between the portions $u$ and $v$.

It will be noted that the spring 10 is bent more than the spring 9, whereby the ends of the springs will not be centrally disposed with respect to the brackets 11 and 12, but will be disposed slightly to the left of the center when facing the front of the device. The springs are fashioned in this manner so as to guide the corn in the required direction. In some other types of corn binders, the packers are disposed on the right-hand side of the corn guideways. In this case the springs would be bent slightly to the right instead of to the left.

I claim:

An attachment for a corn binder comprising supporting brackets adapted to be secured to a corn binder, a leaf spring carried by each bracket, the ends of said springs yieldingly engaging with each other, and a small leaf spring carried by each bracket, said small springs having their ends yieldingly engaging with the inner sides of said first named leaf springs, and terminating short of the ends of said first named springs, whereby said first and second named springs form a guide for the cut corn.

ANTON RIEHLE.